(12) United States Patent
Yoshida et al.

(10) Patent No.: US 9,893,594 B2
(45) Date of Patent: Feb. 13, 2018

(54) ARMATURE OF ROTATING ELECTRICAL MACHINE AND METHOD FOR MANUFACTURING SAME

(75) Inventors: Shinichiro Yoshida, Tokyo (JP); Shuichi Tamura, Tokyo (JP); Masaya Inoue, Tokyo (JP); Akihiro Yamamura, Tokyo (JP); Koichi Ojima, Tokyo (JP); Shogo Okamoto, Tokyo (JP); Yutaro Shirai, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 442 days.

(21) Appl. No.: 14/417,743

(22) PCT Filed: Sep. 12, 2012

(86) PCT No.: PCT/JP2012/073335
§ 371 (c)(1),
(2), (4) Date: Jan. 27, 2015

(87) PCT Pub. No.: WO2014/041637
PCT Pub. Date: Mar. 20, 2014

(65) Prior Publication Data
US 2015/0256052 A1    Sep. 10, 2015

(51) Int. Cl.
*H02K 3/34*       (2006.01)
*H02K 15/08*    (2006.01)
(Continued)

(52) U.S. Cl.
CPC ............... *H02K 9/22* (2013.01); *H02K 3/325* (2013.01); *H02K 3/345* (2013.01); *H02K 3/522* (2013.01);
(Continued)

(58) Field of Classification Search
CPC .............................................. H02K 3/00–3/528
(Continued)

(56) References Cited

U.S. PATENT DOCUMENTS

| 2008/0007134 A1* | 1/2008 | Shimura ................. H02K 3/44 310/214 |
| 2010/0066198 A1* | 3/2010 | Fubuki ................. H02K 15/066 310/208 |
| 2010/0194214 A1 | 8/2010 | Takahashi et al. |

FOREIGN PATENT DOCUMENTS

| JP | 2008-160939 A | 7/2008 |
| JP | 2009-089456 A | 4/2009 |

(Continued)

OTHER PUBLICATIONS

International Search Report of PCT/JP2012/073335 dated Nov. 20, 2012.

*Primary Examiner* — Thomas Truong
(74) *Attorney, Agent, or Firm* — Sughrue Mion, PLLC; Richard C. Turner (57) ABSTRACT

Provided is an armature for a rotating electrical machine, which is capable of improving heat dissipation performance of an edgewise coil to enhance efficiency of the rotating electrical machine. The armature for a rotating electrical machine includes: a core including a yoke section and a tooth section that protrudes from the yoke section; an edgewise coil to be inserted onto the tooth section through intermediation of an insulating member, the edgewise coil being formed by winding a rectangular wire having a rectangular conductor cross-section through edgewise bending; and a heat transfer member filled into a gap between the tooth section and the edgewise coil. The armature has different gaps formed at two regions between the tooth section and a long side of the edgewise coil.

7 Claims, 7 Drawing Sheets

(51) Int. Cl.
*H02K 9/22* (2006.01)
*H02K 3/52* (2006.01)
*H02K 3/32* (2006.01)
*H02K 15/00* (2006.01)
*H02K 15/06* (2006.01)

(52) U.S. Cl.
CPC ......... *H02K 15/0081* (2013.01); *H02K 15/06* (2013.01); *H02K 2213/03* (2013.01); *Y10T 29/49012* (2015.01)

(58) Field of Classification Search
USPC .......................... 310/43, 214, 215, 179, 208
See application file for complete search history.

(56) References Cited

FOREIGN PATENT DOCUMENTS

| | | | |
|---|---|---|---|
| JP | 2010-028914 A | 2/2010 | |
| JP | 2011-254689 A | 12/2011 | |
| WO | 2010/131319 A1 | 11/2010 | |

\* cited by examiner

ARMATURE OF ROTATING ELECTRICAL MACHINE AND METHOD FOR MANUFACTURING SAME

CROSS REFERENCE TO RELATED APPLICATIONS

This is a National Stage of International Application No. PCT/JP2012/073335 filed Sep. 12, 2012, the contents of which are incorporated herein by reference in its entirety.

TECHNICAL FIELD

The present invention relates to an armature for a rotating electrical machine and a method of manufacturing the same.

BACKGROUND ART

In recent years, development aimed at reducing loss of a rotating electrical machine to enhance efficiency thereof has been actively made. One conceivable method for reducing the loss of the rotating electrical machine is to improve the ratio of a copper wire (coil) wound around a core to its winding space, that is, a so-called space factor, to thereby suppress heat generation of copper, that is, copper loss.

Note that, in a direct winding method for directly winding a coil around a core through intermediation of an insulating member, the coil cannot be wound in intimate contact with the core but bulges, and hence the coil cannot be effectively wound in a region to be wound around. In particular, this tendency is more remarkable as the coil becomes thicker, which is responsible for hindering the improvement of the space factor of the coil.

In view of this, the following method is known to deal with such a case. That is, the coil is wound temporarily around a spool prepared separately, and after that, a bulging portion of the coil is externally shaped to correct the bulge, and the coil is then inserted onto the core. The use of such assembling step can improve the space factor of the coil.

As another method for further improving the space factor of the coil, it has been proposed to apply an edgewise coil. The edgewise coil is formed by bending a rectangular wire having a rectangular conductor cross-section in such a direction that the short side of the conductor cross-section is located on an inner side of the axis of the coil.

The use of the edgewise coil can eliminate an unnecessary gap to improve the space factor of the coil as compared to the use of a round wire having a circular conductor cross-section. Besides, the edgewise coil has a single layer structure for the core, and hence, as compared to a round wire to be wound into a plurality of layers, heat can be directly dissipated to the core to improve heat dissipation performance.

The following method has been proposed for the edgewise coil as well. That is, after the edgewise coil is formed once, the edgewise coil is inserted onto the core through intermediation of an insulator, to thereby manufacture a stator (see, for example, Patent Literature 1).

CITATION LIST

Patent Literature

[PTL 1] JP 2011-254689 A

SUMMARY OF INVENTION

Technical Problem

The related art, however, has the following problem.

Patent Literature 1 discloses the structure for securing, when the edgewise coil is inserted onto the core, a certain amount of gap between the edgewise coil and the core through intermediation of the insulator. This insulator has a function of insulating the edgewise coil and the core from each other and another function of dissipating heat generated from the edgewise coil to the core (heat dissipating function).

In the stator disclosed in Patent Literature 1, it is necessary to reduce the thickness of the insulator in order to improve heat dissipation performance of the edgewise coil. To avoid trouble at the time of molding, however, a certain amount of thickness needs to be secured for the insulator, resulting in a problem in that the heat dissipation performance cannot be improved.

The present invention has been made in order to solve the problem as described above, and it is therefore an object thereof to provide an armature for a rotating electrical machine, which is capable of improving heat dissipation performance of an edgewise coil to enhance efficiency of the rotating electrical machine, and to provide a method of manufacturing the armature for a rotating electrical machine.

Solution to Problem

An armature for a rotating electrical machine according to one embodiment of the present invention includes: a core including a yoke section and a tooth section that protrudes from the yoke section; an edgewise coil to be inserted onto the tooth section through intermediation of an insulating member, the edgewise coil being formed by winding a rectangular wire having a rectangular conductor cross-section through edgewise bending; and a heat transfer member filled into a gap between the tooth section and the edgewise coil. The armature has different gaps formed at two regions between the tooth section and a long side of the edgewise coil.

Further, a method of manufacturing an armature for a rotating electrical machine according to one embodiment of the present invention includes the steps of: forming an edgewise coil by winding a rectangular wire having a rectangular conductor cross-section through edgewise bending; inserting, through intermediation of an insulating member, the edgewise coil onto a tooth section of a core including a yoke section and the tooth section that protrudes from the yoke section; shifting the edgewise coil in a short side direction of the edgewise coil; and filling a heat transfer member into a gap between the tooth section and the edgewise coil.

Advantageous Effects of Invention

According to the armature for a rotating electrical machine and the method of manufacturing the same according to one embodiment of the present invention, the different gaps are formed at two regions between the tooth section and the long side of the edgewise coil.

Consequently, thermal resistance of a heat transfer portion for dissipating heat from the edgewise coil to the core can be reduced, and the heat dissipation performance of the edgewise coil can be improved to enhance the efficiency of the rotating electrical machine.

DESCRIPTION OF EMBODIMENTS

Now, an armature for a rotating electrical machine and a method of manufacturing the same according to exemplary embodiments of the present invention are described referring to the accompanying drawings. In the drawings, the same or corresponding parts are denoted by the same reference symbols for description.

Note that, an edgewise coil is sometimes referred to simply as "coil" in the following embodiment. The following embodiment describes the case where the armature for a rotating electrical machine according to the present invention is applied to a stator. However, without being limited thereto, the armature for a rotating electrical machine according to the present invention may be applied to a rotor.

First Embodiment

Figure 1:
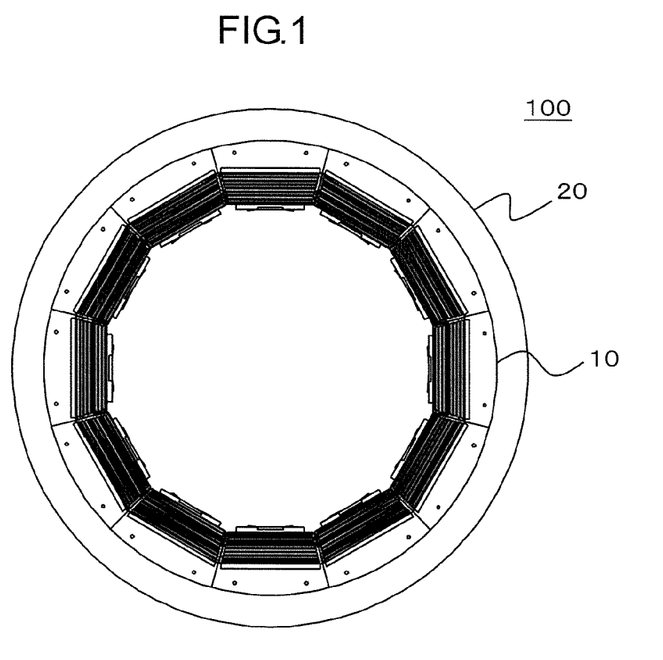
FIG. 1 is a top view illustrating a stator constructed by armatures for a rotating electrical machine according to a first embodiment of the present invention.

FIG. 1 is a top view illustrating a stator 100 constructed by armatures 10 for a rotating electrical machine according to a first embodiment of the present invention. In FIG. 1, the stator 100 includes the armatures 10 arranged in an annular pattern and a frame 20 arranged on an outer circumference of the armatures 10. The frame 20 has interference and is configured to fixedly hold the armatures 10 by press-fitting or interference shrink fitting.

Figure 2:
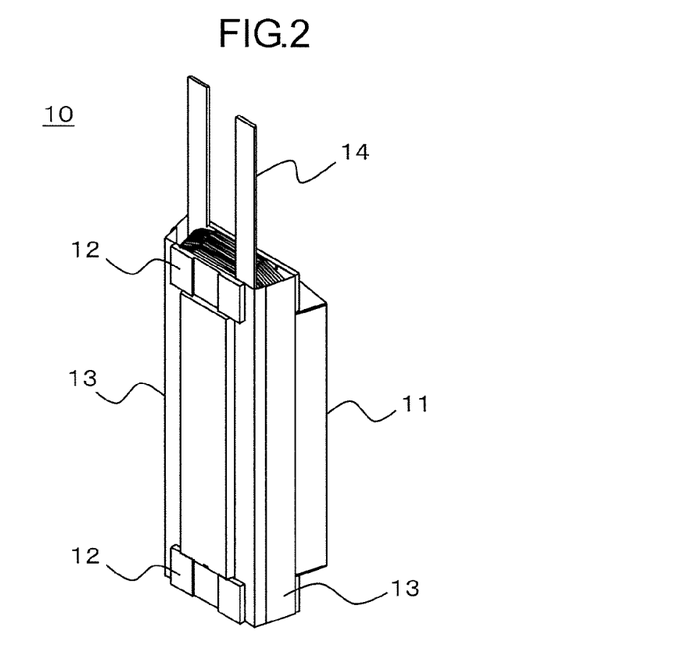
FIG. 2 is a perspective view illustrating the armature for a rotating electrical machine according to the first embodiment of the present invention.

FIG. 2 is a perspective view illustrating the armature for a rotating electrical machine according to the first embodiment of the present invention. In FIG. 2, the armature 10 includes a core 11, an insulator (insulating member) 12, insulating paper (insulating member) 13, and a coil 14.

Figure 3:
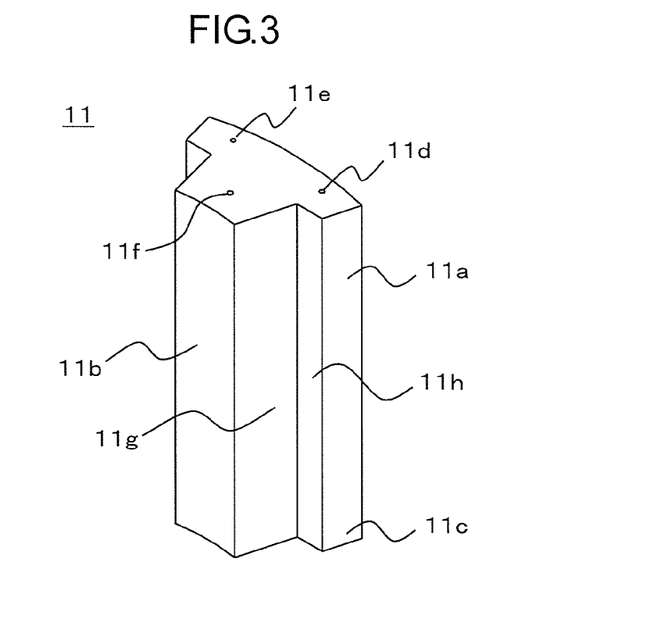
FIG. 3 is a perspective view illustrating a core for a rotating electrical machine according to the first embodiment of the present invention.

FIG. 3 is a perspective view illustrating the core 11 for a rotating electrical machine according to the first embodiment of the present invention. In FIG. 3, the core 11 includes a yoke section 11a, and a tooth section 11b that protrudes from the yoke section 11a in a central direction of the stator 100.

The core 11 is formed by laminating thin steel plates 11c. In this case, iron loss can be suppressed when silicon steel plates are used as the thin steel plates 11c. The laminated thin steel plates 11c are integrally fixed together by being crimped with dowels 11d, 11e, and 11f formed by press-molding.

Note that, another method for fixing the laminated thin steel plates 11c is a method of fixing with an adhesive, a method of fixing by welding, or the like. A surface of the tooth section 11b to be opposed to the coil 14 is referred to as "tooth section side surface 11g", and a surface of the yoke section 11a to be opposed to the coil 14 is referred to as "yoke section side surface 11h".

Figure 4:
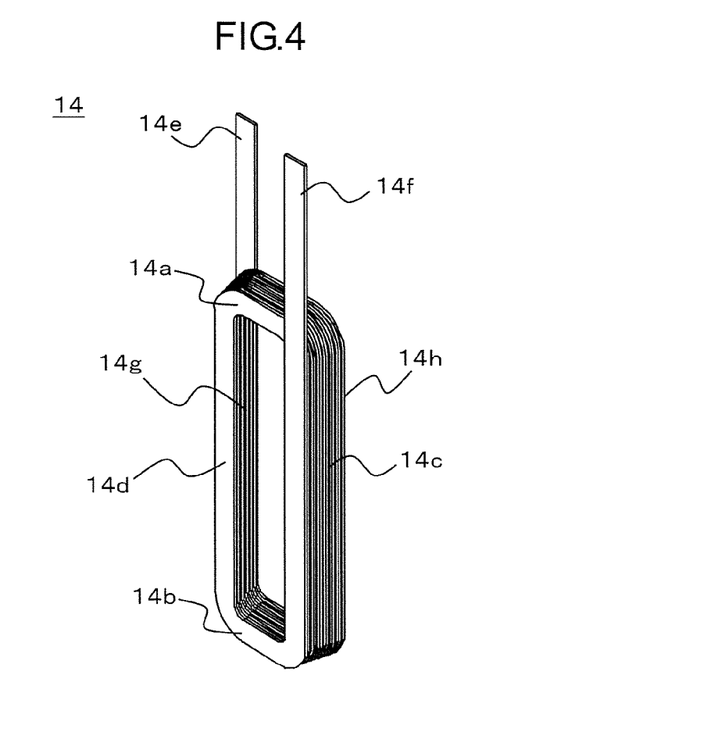
FIG. 4 is a perspective view illustrating an edgewise coil for a rotating electrical machine according to the first embodiment of the present invention.

FIG. 4 is a perspective view illustrating the edgewise coil 14 for a rotating electrical machine according to the first embodiment of the present invention. In FIG. 4, the coil 14 is formed by winding a rectangular wire having a rectangular conductor cross-section through so-called edgewise bending, which involves bending the rectangular wire in such a direction that the short side of the conductor cross-section is located on an inner side of the axis of the coil. The coil 14 is inserted onto the tooth section 11b of the core 11.

The coil 14 includes coil end portions 14a and 14b, which serve as the short sides of the coil on both sides in an axial direction of the stator 100, slot portions 14c and 14d, which serve as the long sides of the coil, and two coil terminals 14e and 14f, which serve as terminals. In this case, the coil 14 is formed of a conductor having a surface covered with an insulating coating, such as polyamide imide.

Note that, a surface of each of the slot portions 14c and 14d to be opposed to the tooth section 11b (tooth section side surface 11g) of the core 11 is referred to as "slot inner circumferential surface 14g", and a surface of each of the slot portions 14c and 14d to be opposed to the yoke section 11a (yoke section side surface 11h) of the core 11 is referred to as "slot yoke surface 14h".

The coil terminals 14e and 14f are three-phase connected after being assembled into the state of the stator 100. Note that, the coil terminals 14e and 14f extend in the same direction in the first embodiment of the present invention, but without being limited thereto, the coil terminals 14e and 14f may extend in opposite directions. In this case, the coil terminals 14e and 14f are connected on both sides in the axial direction of the stator 100, respectively.

Figure 5:
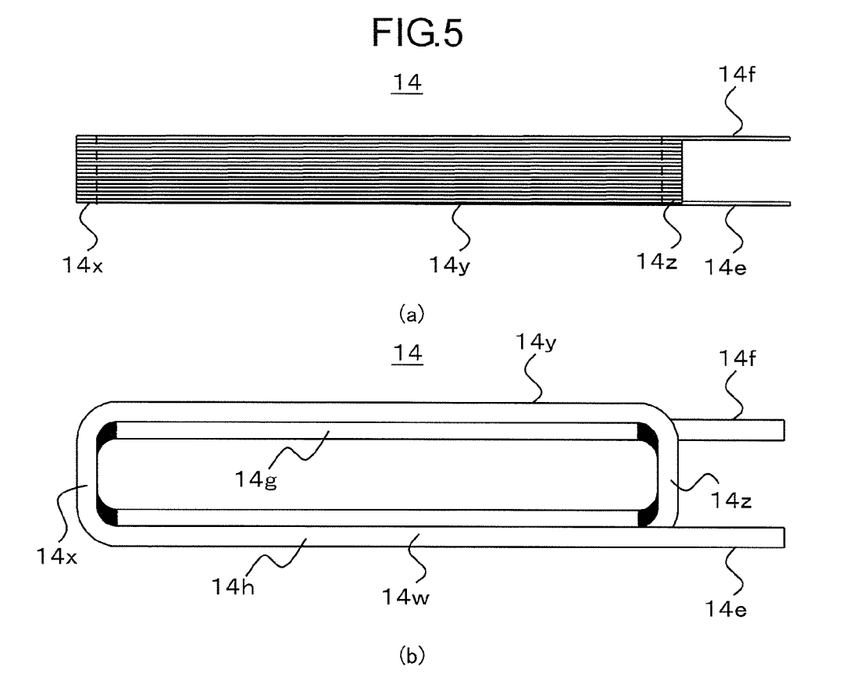
FIGS. 5(a) and 5(b) are a side view and a top view illustrating the edgewise coil for a rotating electrical machine according to the first embodiment of the present invention, respectively.

FIGS. 5(a) and 5(b) are a side view and a top view illustrating the edgewise coil 14 for a rotating electrical machine according to the first embodiment of the present invention, respectively. In FIG. 5, the coil 14 is formed by winding a rectangular wire in a spiral manner in an order of the coil terminal 14e, a slot portion 14w, a coil end portion 14x, a slot portion 14y, a coil end portion 14z, . . . a coil terminal 14f.

In this case, the slot portion 14w is the slot portion 14d next to the coil terminal 14e and closest to the slot yoke surface 14h side, the coil end portion 14x is the coil end portion 14b next to the slot portion 14w and closest to the slot yoke surface 14h side, the slot portion 14y is the slot portion 14c next to the coil end portion 14x and closest to the slot yoke surface 14h side, and the coil end portion 14z is the coil end portion 14a next to the slot portion 14y and closest to the slot yoke surface 14h side.

In FIG. 5, the coil 14 is wound for the second turn from the first turn in a manner that the coil end portion becomes gradually sloped from the slot portion 14y located farther from the coil terminal 14e, and the coil end portion 14z located closer to the coil terminal 14e and the coil terminal 14e are overlapped with each other to start the second turn.

After that, rectangular wires are similarly stacked on one another to be wound a predefined number of turns. Accordingly, the slot portion 14w next to the coil terminal 14e and the other slot portion 14y are not present on the same plane. Thus, a gap between the slot portion 14w next to the coil terminal 14e and the core 11 is smaller than a gap between the other slot portion 14y and the core 11.

Figure 6:
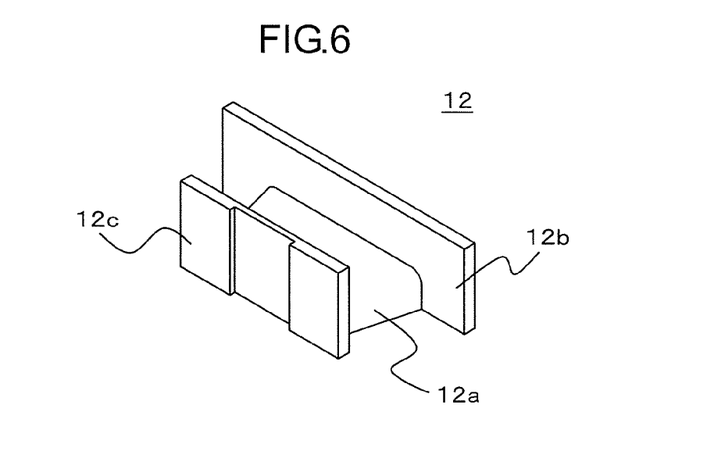
FIG. 6 is a perspective view illustrating an insulator for a rotating electrical machine according to the first embodiment of the present invention.

FIG. 6 is a perspective view illustrating the insulator for a rotating electrical machine according to the first embodiment of the present invention. In FIG. 6, the insulator 12 has a substantially U-shape, and includes a coil receiving portion 12a to be arranged between the coil 14 and the core 11, an outer wall 12b arranged at the side surface of the coil receiving portion 12a on the yoke section 11a side of the core 11, and an inner wall 12c arranged on the distal end side of the tooth section 11b of the core 11.

In this case, the outer wall 12b and the inner wall 12c are used to regulate the coil end portions 14a and 14b so that the coil end portions 14a and 14b may not protrude to the outer radial side or the inner radial side of the stator 100. Note that, the insulator 12 is formed of a thermoplastic resin, a thermosetting resin, or other such resins having heat resistance.

Figure 7:
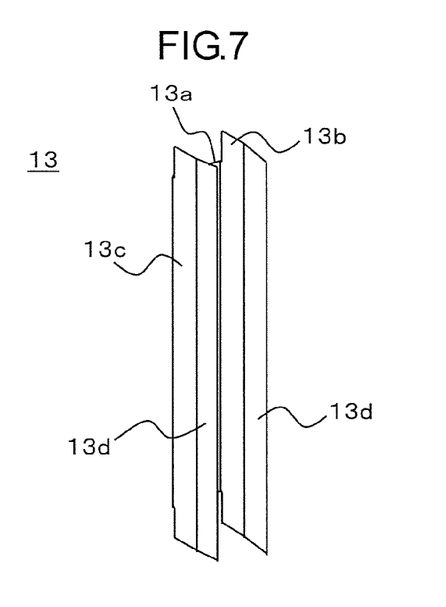
FIG. 7 is a perspective view illustrating insulating paper for a rotating electrical machine according to the first embodiment of the present invention.

FIG. 7 is a perspective view illustrating the insulating paper 13 for a rotating electrical machine according to the first embodiment of the present invention. Note that, the insulating paper 13 is a sheet formed by using a material having heat resistance property and insulation property and laminating a plurality of the materials. For example, aramid paper, polyphenylene sulfide (PPS), and aramid paper laminated in this order are used.

In FIG. 7, the insulating paper 13 includes a tooth insulating portion 13a for covering the tooth section side surface 11g and the slot inner circumferential surface 14g, a yoke insulating portion 13b for covering the yoke section side surface 11h and the slot yoke surface 14h, a tooth distal end insulating portion 13c for covering the coil 14 on the distal end side of the tooth section 11b, and a phase-to-phase insulating portion 13d for covering the outer side of the coil 14 to secure phase-to-phase insulation in an assembled state of the stator 100.

Figure 8:
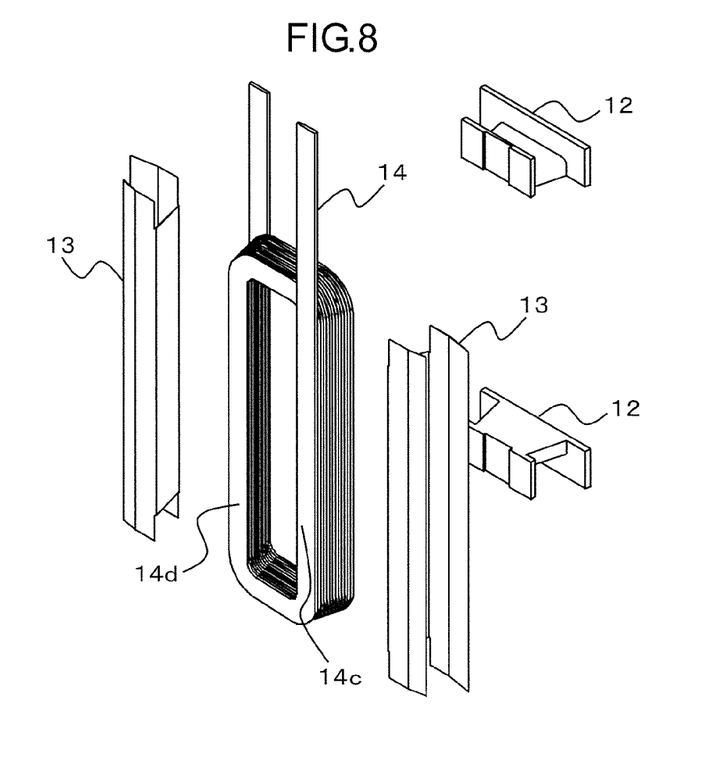
FIG. 8 is a perspective view illustrating a procedure of assembling the armature for a rotating electrical machine according to the first embodiment of the present invention.
Figure 9:
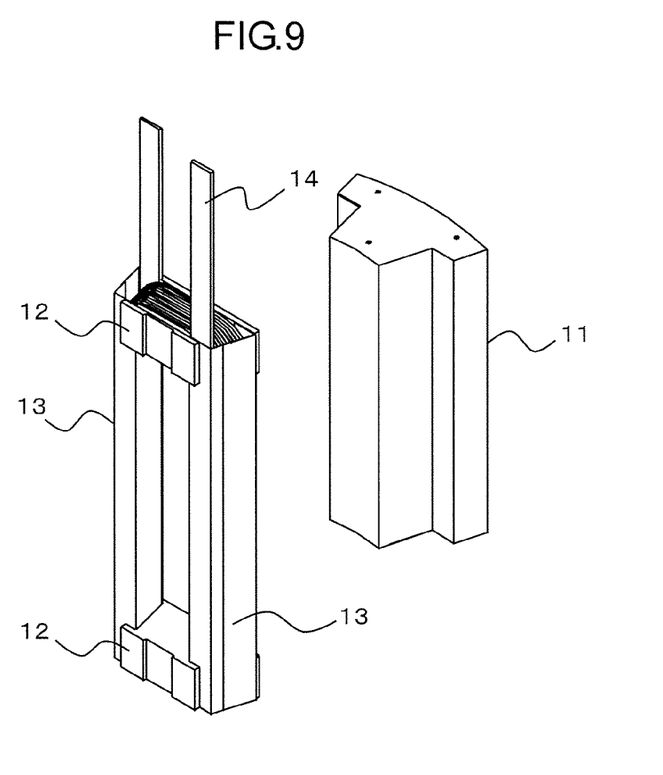
FIG. 9 is a perspective view illustrating the procedure of assembling the armature for a rotating electrical machine according to the first embodiment of the present invention.

Now, a procedure of assembling the armature 10 for a rotating electrical machine according to the first embodiment of the present invention is described with reference to FIGS. 8 and 9. FIGS. 8 and 9 are perspective views illustrating the procedure of assembling the armature 10 for a rotating electrical machine according to the first embodiment of the present invention.

First, as illustrated in FIG. 8, the insulating paper 13 is wound around each of the slot portions 14c and 14d of the coil 14. In this case, the tooth insulating portion 13a of the insulating paper 13 is arranged on an inner circumferential side of each of the slot portions 14c and 14d, and the yoke insulating portion 13b and the tooth distal end insulating portion 13c are folded, followed by overlapping the phase-to-phase insulating portions 13d with each other.

Next, the insulator 12 is internally inserted into each of the coil end portions 14a and 14b of the coil 14. Subsequently, as illustrated in FIG. 9, with regard to the coil 14 to which the insulator 12 and the insulating paper 13 are assembled, the tooth section 11b of the core 11 is inserted inside the coil 14, to thereby complete the armature 10 for a rotating electrical machine.

Next, a dimensional relationship between the coil 14 and the core 11 of the armature 10 for a rotating electrical machine according to the first embodiment of the present invention is described with reference to FIG. 10. FIGS. 10(a) and 10(b) are cross-sectional views illustrating the core 11 and the edgewise coil 14 for a rotating electrical machine according to the first embodiment of the present invention, respectively.

Figure 10:
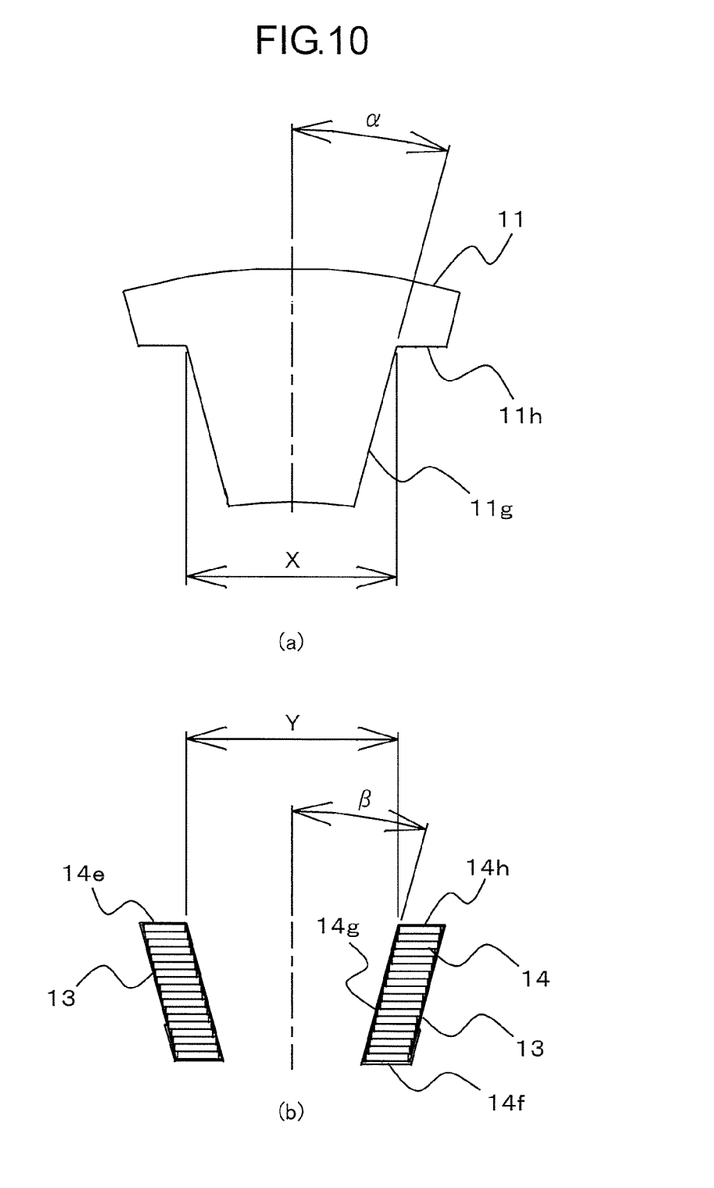
FIGS. 10(a) and 10(b) are cross-sectional views illustrating the core and the edgewise coil for a rotating electrical machine according to the first embodiment of the present invention, respectively.

In FIG. 10, there are heat transfer paths for dissipating heat of the coil 14 to the core 11, specifically, a path through which the heat dissipates from the slot inner circumferential surface 14g of the coil 14 to the tooth section side surface 11g of the core 11, and a path through which the heat dissipates from the slot yoke surface 14h of the coil 14 to the yoke section side surface 11h of the core 11.

In the first embodiment of the present invention, the dimensional relationship for assembling of the coil 14 and the core 11 is defined to X>Y, where X represents the width of the tooth section 11b of the core 11 as illustrated in FIG. 10(a) and Y represents the width of the coil 14 on the slot yoke surface 14h side (including the insulating paper 13) as illustrated in FIG. 10(b).

Further, the dimensional relationship is defined to $\alpha > \beta$, where $\alpha$ represents the angle of the tooth section side surface 11g with respect to the center line of the core 11 as illustrated in FIG. 10(a) and $\beta$ represents the angle of the slot inner circumferential surface 14g with respect to the center line of the coil 14 as illustrated in FIG. 10(b).

The coil 14 and the core 11 are assembled based on the above-mentioned dimensional relationship, and the center position of the coil 14 with respect to the core 11 is shifted in the direction of the coil terminal 14f (circumferential direction of the stator 100). In this manner, gaps between the slot inner circumferential surface 14g of the coil 14 and the tooth section side surface 11g of the core 11 are formed to be left-right asymmetric.

Figure 11:
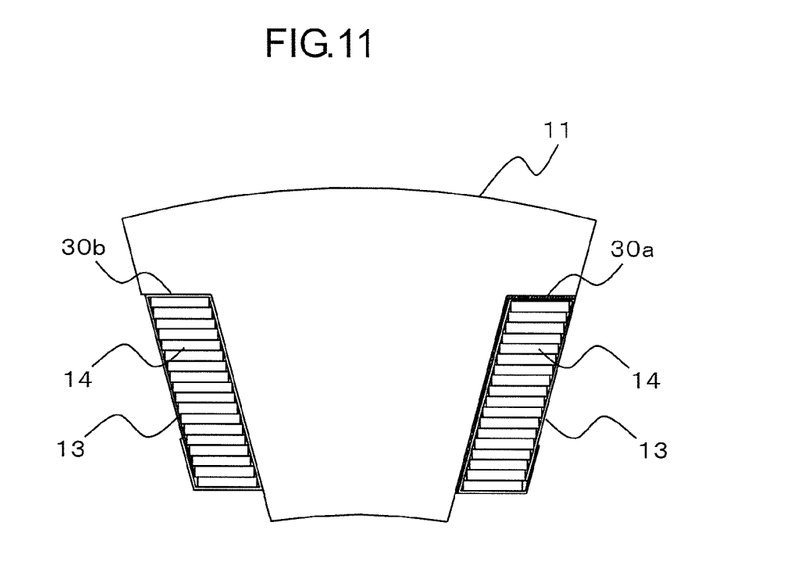
FIG. 11 is a cross-sectional view of the armature for a rotating electrical machine according to the first embodiment of the present invention.

Next, a relationship between the coil 14 and the core 11 of the armature 10 for a rotating electrical machine according to the first embodiment of the present invention is described with reference to FIG. 11. FIG. 11 is a cross-sectional view of the armature 10 for a rotating electrical machine according to the first embodiment of the present invention.

In FIG. 11, in this state, the gaps between the coil 14 and the core 11 are filled with varnishes (heat transfer members) 30a and 30b having high thermal conductivity. According to this structure, the gaps between the slot inner circumferential surface 14g and the tooth section side surface 11g are left-right asymmetric, and hence the thickness of the varnish 30a in the narrower gap is smaller than the thickness of the varnish 30b in the wider gap.

In this case, parallel thermal resistance is formed, and hence the whole thermal resistance is smaller than that when the thicknesses of the varnishes 30a and 30b are equal to each other. Consequently, heat dissipation performance of the edgewise coil 14 is improved to enhance efficiency of the rotating electrical machine.

Further, as described above, the gap between the slot portion 14w next to the coil terminal 14e and the core 11 is smaller than the gap between the other slot portion 14y and the core 11 (see FIG. 5), and hence the whole thermal resistance is further reduced, and the heat dissipation performance of the edgewise coil 14 is improved to enhance the efficiency of the rotating electrical machine.

As described above, according to the first embodiment, the different gaps are formed at two regions between the tooth section and the long side of the edgewise coil. Consequently, thermal resistance of a heat transfer portion for dissipating heat from the edgewise coil to the core can be reduced, and the heat dissipation performance of the edgewise coil can be improved to enhance the efficiency of the rotating electrical machine.

Note that, in the above description of the first embodiment, the gaps between the coil 14 and the core 11 are filled with the varnishes (heat transfer members) 30a and 30b. However, without being limited thereto, the heat transfer member to fill the gap between the coil 14 and the core 11 may be heat conductive silicon. The heat conductive silicon has high viscosity and cannot infiltrate the gap when applied after the coil 14 and the core 11 are assembled together. Thus, the heat conductive silicon needs to be applied before assembly.

The heat transfer member is applied by the following method. In pre-application before assembly, for example, the heat transfer members are applied on the tooth section 11b of the core 11 so as to vary the thicknesses of the heat transfer members in a left-right asymmetric manner, specifically, so as to have a smaller thickness on the side with a smaller clearance and have a larger thickness on the side with a larger clearance, and after that, the coil 14 is assembled to the core 11, to thereby manufacture the armature 10. In this case, the use of heat conductive silicon having high thermal conductivity can further improve the heat dissipation performance of the edgewise coil 14.

The invention claimed is:

1. An armature for a rotating electrical machine, comprising:
    a core comprising a yoke section and a tooth section that protrudes from the yoke section;
    an edgewise coil to be inserted onto the tooth section through intermediation of an insulating member, the edgewise coil being formed by winding a rectangular wire having a rectangular conductor cross-section through edgewise bending; and
    a heat transfer member filled into a gap between the tooth section and the edgewise coil,
    wherein the tooth section of the core comprises a left tooth section side surface and a right tooth section side surface that are opposed to the edgewise coil, and the edgewise coil comprises a left slot inner circumferential surface and a right slot inner circumferential surface that are opposed to the left tooth section side surface and the right tooth section side surface of the tooth section, respectively, and
    wherein a size of a left gap between the left tooth section side surface and the left slot inner circumferential surface is different from a size of a right gap between the right tooth section side surface and the right slot inner circumferential surface.

2. An armature for a rotating electrical machine according to claim 1, wherein the left gap and the right gap are formed between the yoke section and a long side of the edgewise coil.

3. An armature for a rotating electrical machine according to claim 2, wherein the heat transfer member comprises varnish.

4. An armature for a rotating electrical machine according to claim 2, wherein the heat transfer member comprises heat conductive silicon.

5. An armature for a rotating electrical machine according to claim 1, wherein the heat transfer member comprises varnish.

6. An armature for a rotating electrical machine according to claim 1, wherein the heat transfer member comprises heat conductive silicon.

7. A method of manufacturing an armature for a rotating electrical machine, comprising the steps of:
    forming an edgewise coil by winding a rectangular wire having a rectangular conductor cross-section through edgewise bending;
    inserting, through intermediation of an insulating member, the edgewise coil onto a tooth section of a core comprising a yoke section and the tooth section that protrudes from the yoke section, the tooth section of the core comprising a left tooth section side surface and a right tooth section side surface that are opposed to the edgewise coil, the edgewise coil comprising a left slot inner circumferential surface and a right slot inner circumferential surface that are opposed to the left tooth section side surface and the right tooth section side surface of the tooth section, respectively;
    shifting the edgewise coil in a short side direction of the edgewise coil to have a left gap between the left tooth section side surface and the left slot inner circumferential surface different from a right gap between the right tooth section side surface and the right slot inner circumferential surface; and
    filling a heat transfer member into a gap between the tooth section and the edgewise coil.

* * * * *